: US008222087B2

(12) United States Patent
Freitag et al.

(10) Patent No.: US 8,222,087 B2
(45) Date of Patent: Jul. 17, 2012

(54) SEED LAYER FOR A HEAT SPREADER IN A MAGNETIC RECORDING HEAD

(75) Inventors: James M. Freitag, Sunnyvale, CA (US); Howard G. Zolla, San Jose, CA (US)

(73) Assignee: HGST Netherlands, B.V., Amsterdam (NL)

( * ) Notice: Subject to any disclaimer, the term of this patent is extended or adjusted under 35 U.S.C. 154(b) by 441 days.

(21) Appl. No.: 11/613,122

(22) Filed: Dec. 19, 2006

(65) Prior Publication Data

US 2008/0145974 A1  Jun. 19, 2008

(51) Int. Cl.
*H01L 21/00* (2006.01)

(52) U.S. Cl. .. 438/122; 438/795; 257/712; 257/E21.084

(58) Field of Classification Search .................. 257/712, 257/E21.084; 438/21, 795, 122
See application file for complete search history.

(56) References Cited

U.S. PATENT DOCUMENTS

| 6,636,395 | B1 | 10/2003 | Terunuma |
| 7,009,818 | B1 | 3/2006 | Arnold et al. |
| 2002/0145834 | A1 | 10/2002 | Inoue et al. |
| 2003/0179490 | A1* | 9/2003 | Matsumoto et al. ........ 360/97.01 |
| 2003/0202294 | A1 | 10/2003 | Terunuma |
| 2003/0235015 | A1* | 12/2003 | Wu ................ 360/321 |
| 2004/0161636 | A1* | 8/2004 | Hujanen et al. ............... 428/692 |
| 2004/0224185 | A1 | 11/2004 | Nakamura et al. |
| 2004/0247943 | A1* | 12/2004 | Girt et al. .................... 428/694 T |
| 2005/0121778 | A1* | 6/2005 | Liu et al. ........................ 257/718 |
| 2005/0138796 | A1* | 6/2005 | Takahashi et al. .......... 29/603.14 |
| 2005/0141146 | A1* | 6/2005 | Pinarbasi ................... 360/324.1 |
| 2005/0219749 | A1 | 10/2005 | Aoki et al. |
| 2005/0233260 | A1 | 10/2005 | Isobe et al. |
| 2006/0012925 | A1 | 1/2006 | Pinarbasi |
| 2006/0028763 | A1 | 2/2006 | Matono |
| 2006/0044680 | A1 | 3/2006 | Liu et al. |
| 2006/0044683 | A1 | 3/2006 | Matono et al. |
| 2006/0057430 | A1 | 3/2006 | Kuboki |
| 2006/0154110 | A1* | 7/2006 | Hohlfeld et al. .............. 428/823 |

(Continued)

FOREIGN PATENT DOCUMENTS

WO  WO 02/069373 A2  9/2002

(Continued)

OTHER PUBLICATIONS

Iriarte, Gonzalo F. et al., Synthesis of C-Axis-Oriented AlN Thin Films on High-Conducting Layers: Al, Mo, Ti, TiN, and Ni, IEEE Transactions on Ultrasonics, Ferroelectrics, and Frequency Control, vol. 52, No. 7, pp. 1170-1174 (2005).

(Continued)

*Primary Examiner* — Matthew Reames
*Assistant Examiner* — Elias M Ullah
(74) *Attorney, Agent, or Firm* — Duft Bornsen & Fishman, LLP

(57) ABSTRACT

Magnetic recording heads and associated fabrication methods are disclosed. A heat spreader structure in a magnetic recording head includes a seed layer with a heat spreader layer formed on the seed layer. When the heat spreader layer (e.g., Aluminum Nitride) is grown on the seed layer (e.g., NiTa or Alumina), the heat spreader layer forms a well-oriented crystalline structure that allows for a desired thermal conductivity, such as a thermal conductivity greater than about 55 W/m–K. As a result of using the seed layer, a material such as Aluminum Nitride can be used for a heat spreader layer to effectively dissipate heat in a magnetic recording head.

17 Claims, 4 Drawing Sheets

U.S. PATENT DOCUMENTS

| | | | |
|---|---|---|---|
| 2006/0249371 A1* | 11/2006 | Ichihara et al. | 204/192.2 |
| 2006/0262454 A1* | 11/2006 | Hirata et al. | 360/126 |
| 2007/0087226 A1* | 4/2007 | Matsumoto et al. | 428/828.1 |
| 2007/0121255 A1* | 5/2007 | Tsuchiya et al. | 360/324.1 |
| 2007/0217067 A1* | 9/2007 | Nakamura et al. | 360/126 |

FOREIGN PATENT DOCUMENTS

| | | |
|---|---|---|
| WO | WO 03/040338 A2 | 5/2003 |
| WO | WO 2004/036707 A3 | 4/2004 |

OTHER PUBLICATIONS

Assouar, M. B. et al., Low Temperature AlN Thin Films Growth for Layered Structure Saw and Baw Devices, IEEE International on Ultrasonics, Ferroelectrics, and Frequency Control Joint 50th Anniversary Conference, pp. 43-46 (2004).

Mirzamaani, Mohammad et al., Recording Performance of Thin Film Media With Various Crystallographic Preferred Orientations on Glass Substrates, IEEE Transactions on Magnetics, vol. 34, No. 4, pp. 1588-1590 (1998).

Morisako, A. et al., Preparation of Double Layer Hexagonal Ferrite Films for High Density Longitudinal Magnetic Recording Media, IEEE Transactions on Magnetics, vol. 20, No. 5, pp. 815-817 (1984).

Mirzamaani, Mohammad et al., Magnetic Performance and Tribology of Sputter-Textured Thin Film Disks, IEEE Transactions on Magnetics, vol. 32, No. 5, pp. 3638-3641 (1996).

Morosanu, C. et al., Optical, Electrical and Structural Properties of AlN Thin Films, IEEE, Institute of Physics and Technology of Materials, pp. 183-186 (1995).

* cited by examiner

SEED LAYER FOR A HEAT SPREADER IN A MAGNETIC RECORDING HEAD

BACKGROUND OF THE INVENTION

1. Field of the Invention

The invention is related to the field of magnetic disk drive systems and, in particular, to a seed layer for a heat spreader in a magnetic recording head. More particularly, a heat spreader layer grown on the seed layer has a well-oriented crystalline structure to improve the thermal conductivity of the heat spreader layer and to improve heat dissipating characteristics in the magnetic recording head.

2. Statement of the Problem

Many computer systems use magnetic disk drives for mass storage of information. Magnetic disk drives typically include one or more magnetic recording heads (sometimes referred to as sliders) that include read elements and write elements. A suspension arm holds the recording head above a magnetic disk. When the magnetic disk rotates, an air flow generated by the rotation of the magnetic disk causes the air bearing surface (ABS) side of the recording head to fly at a particular height above the magnetic disk. The height depends on the shape of the ABS. As the recording head rides on the air bearing, an actuator moves an arm that is connected to the suspension arm to position the read element and the write element over selected tracks of the magnetic disk.

To read data from the magnetic disk, transitions on a track of the magnetic disk create magnetic fields. As the read element passes over the transitions, the magnetic fields of the transitions modulate the resistance of the read element. The change in resistance of the read element is detected by passing a sense current through the read element and then measuring the change in voltage across the read element. The resulting signal is used to recover the data encoded on the track of the magnetic disk.

In one scheme used to write data to the magnetic disk, the write element passes a magnetic flux through a first write pole and into the magnetic disk. The magnetic flux flows through a soft underlayer in the magnetic disk and returns to the write element through a second write pole. The magnetic flux creates a transition in the magnetic disk that is stored as a bit.

A typical magnetic recording head is fabricated on a substrate using the following layers. An undercoat, such as $Al_2O_3$, is first formed on the substrate. Typical substrates are made from an Alumina-Titanium Carbide composite (AlTiC) material. The layers for the read element are then formed on the undercoat, where the layers of the read element typically include a first shield layer, a first gap layer, the read element (e.g., a magnetoresistive (MR) read element), a second gap layer, and a second shield layer. The layers for the write element are then formed. The layers for the write element typically include a first write pole, a coil, a second write pole, and gap material or insulating material between the write poles. The layers of the write element are then covered with an overcoat, such as $Al_2O_3$. A structure such as this for a magnetic recording head is illustrated in FIG. 1.

In normal operation of a magnetic disk drive system, heat can affect the magnetic recording head. For instance, because the magnetic recording head is fabricated from different materials having different coefficients of thermal expansion, the pole tips of the write element may protrude toward or recess away from the magnetic disk, which can negatively affect the operation of the write element. To alleviate the effects of heat, magnetic recording heads may be fabricated with a heat spreader. The heat spreader (or heat spreader layer) may be formed in the undercoat between the substrate and the first shield using a metallic material having a high thermal conductivity. Some typical materials used for a heat spreader layer are Tungsten (W) or a NiFe alloy. The heat spreader helps to dissipate heat in the magnetic recording head.

One problem with using Tungsten (W) for a heat spreader is that it corrodes when it is exposed at the ABS of the magnetic recording head. Thus, a heat spreader formed from Tungsten (W) has to be patterned, which requires extra lithography, hard mask, and etching steps. Also, the areas where the heat spreader is removed needs to be filled with an insulating material which adds time and expense to the fabrication process.

Another material suggested to be used as a possible heat spreader is Aluminum Nitride (AlN). Aluminum Nitride as a material has high thermal conductivity much like W, but does not corrode as easily. Unfortunately, when Aluminum Nitride is grown on an AlTiC substrate or an amorphous $Al_2O_3$ undercoat, the thermal conductivity is reduced which makes Aluminum Nitride less effective as a heat spreader. As a result, Aluminum Nitride has not been effectively used in magnetic recording heads as a material for a heat spreader.

SUMMARY OF THE SOLUTION

The invention solves the above and other related problems by using a seed layer in conjunction with the heat spreader layer to achieve a desired thermal conductivity in the heat spreader layer. When the heat spreader layer is grown on the seed layer (e.g., NiTa or Alumina), the heat spreader layer forms a well-oriented crystalline structure that allows for a desired thermal conductivity, such as a thermal conductivity greater than about 55 W/m–K. As a result of using the seed layer, a material such as Aluminum Nitride can advantageously be used for a heat spreader layer to effectively dissipate heat in a magnetic recording head.

In one embodiment of the invention, a magnetic recording head includes a heat spreader structure comprised of a seed layer with a heat spreader layer formed on the seed layer. The seed layer is made from a material, such as NiTa or Alumina, which is adapted to increase the thermal conductivity of the heat spreader layer when the heat spreader layer is grown on the seed layer. The seed layer generates a well-oriented crystalline structure in the heat spreader layer to increase the thermal conductivity of the heat spreader layer. The heat spreader structure may be fabricated in the undercoat of the magnetic recording head or other desired areas of the magnetic recording head.

In another embodiment, the heat spreader structure is formed in the undercoat of a magnetic recording head. The undercoat thus includes a NiTa seed layer formed on an ALTiC substrate. The undercoat also includes an Aluminum Nitride heat spreader layer formed on the NiTa seed layer. When the Aluminum Nitride layer is grown on the NiTa seed layer, the NiTa seed layer generates a well-oriented crystalline structure in the Aluminum Nitride layer to increase the thermal conductivity to about 66 W/m–K.

In another embodiment, the undercoat of a magnetic recording head includes an Alumina seed layer formed on an AlTiC substrate. The undercoat also includes an Aluminum Nitride heat spreader layer formed on the Alumina seed layer. When the Aluminum Nitride layer is grown on the Alumina seed layer, the Alumina seed layer generates a well-oriented crystalline structure in the Aluminum Nitride layer to increase the thermal conductivity to about 55 W/m–K.

The invention may include other exemplary embodiments described below.

DESCRIPTION OF THE DRAWINGS

The same reference number represents the same element or same type of element on all drawings.

DETAILED DESCRIPTION OF THE INVENTION

Figure 1:
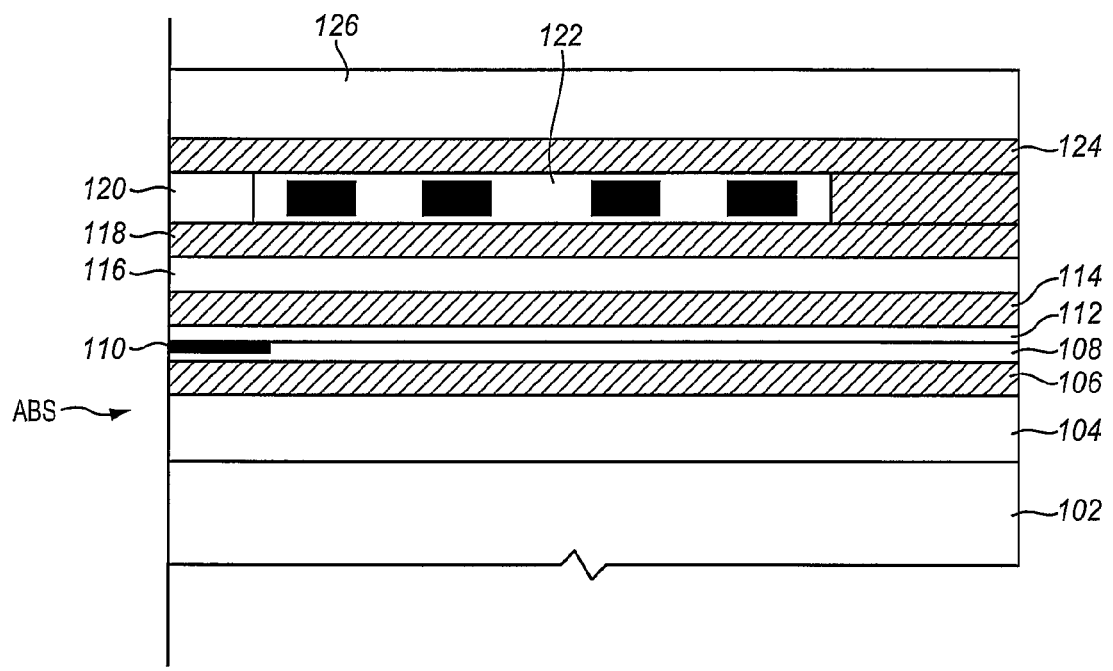
FIG. 1 is a cross-sectional view of a magnetic recording head in the prior art.

FIG. 1 is a cross-sectional view of a magnetic recording head 100 in the prior art. The orientation of FIG. 1 is such that the air bearing surface (ABS) of magnetic recording head 100 is to the left. Magnetic recording head 100 is a structure comprised of a plurality of thin-film layers deposited on an AlTiC substrate 102. Magnetic recording head 100 further includes an undercoat 104 formed on substrate 102, which is typically comprised of amorphous $Al_2O_3$. Magnetic recording head 100 further includes a first shield 106, a first gap layer 108, a read element 110, a second gap layer 112, and a second shield 114. Shield 106 and shield 114 are typically formed from NiFe and provide magnetic shielding for read element 110 when read element 110 is performing a read operation. Gap layers 108 and 112 are typically formed from $Al_2O_3$ and provide insulation between shield 106 and shield 114.

Magnetic recording head 100 further includes a gap layer 116 deposited on shield 114 (assuming that shield 114 is not used as a write pole for the write element). The structure of magnetic recording head 100 then includes the layers used to form the write element of head 100. The write element includes a first write pole 118, a write gap layer 120, a write coil 122, and a second write pole 124. Write pole 118 and write pole 124 are typically formed from NiFe. Write gap layer 120 is typically formed from amorphous $Al_2O_3$ and defines a desired distance between write pole 118 and write pole 124. When an electrical current is passed through write coil 122, a magnetic flux is generated that can pass through write pole 118, through a magnetic disk (not shown) proximate to the ABS, and return through write pole 124. Magnetic recording head 100 further includes an overcoat layer 126 typically formed from amorphous $Al_2O_3$ that is deposited on write pole 124. The structure shown in FIG. 1 is just one example and those skilled in the art are aware of multiple variations.

In normal operation, heat can affect magnetic recording head 100 in a negative manner. As heat enters magnetic recording head 100 or is generated in magnetic recording head 100, the heat is kept in head 100 by undercoat 104 and overcoat 126 as these layers are thermal insulators. Because magnetic recording head 100 is fabricated from different materials having different coefficients of thermal expansion, the tip of write pole 118 and/or write pole 124 may protrude toward or recess away from a magnetic disk (not shown) proximate to the ABS, which can negatively affect the operation of the write element.

Figure 2:
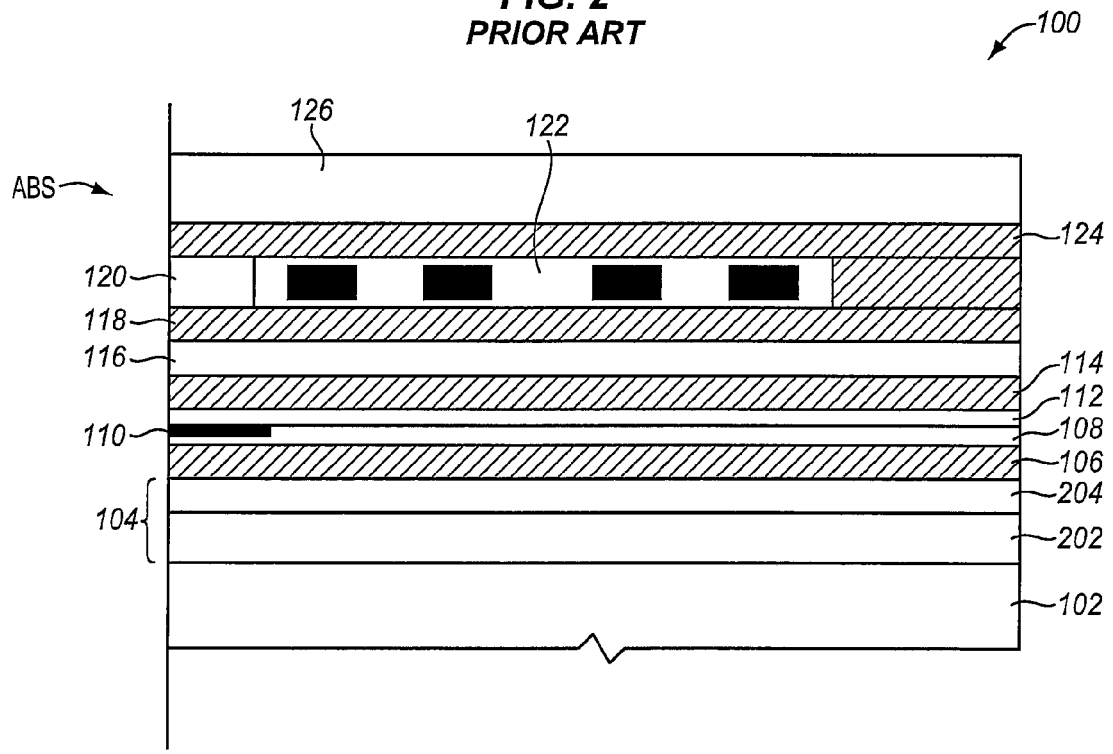
FIG. 2 is another cross-sectional view of a magnetic recording head with a heat spreader in the prior art.

To alleviate the effects of heat, magnetic recording heads may be fabricated with a heat spreader. FIG. 2 is another cross-sectional view of magnetic recording head 100 with a heat spreader in the prior art. Magnetic recording head 100 as shown in FIG. 2 includes the same layers as in FIG. 1, except that undercoat 104 is comprised of a first insulating layer 202 of amorphous $Al_2O_3$ and a heat spreader layer 204. Heat spreader layer 204 is typically formed from Tungsten (W). Because heat spreader layer 204 has high thermal conductivity, it is able to dissipate heat in magnetic recording head 100. As stated in the Background, there are unfortunately issues with present heat spreader layers and it is desirable to fabricate magnetic recording heads with more effective heat spreader layers.

FIGS. 3-8 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 3:
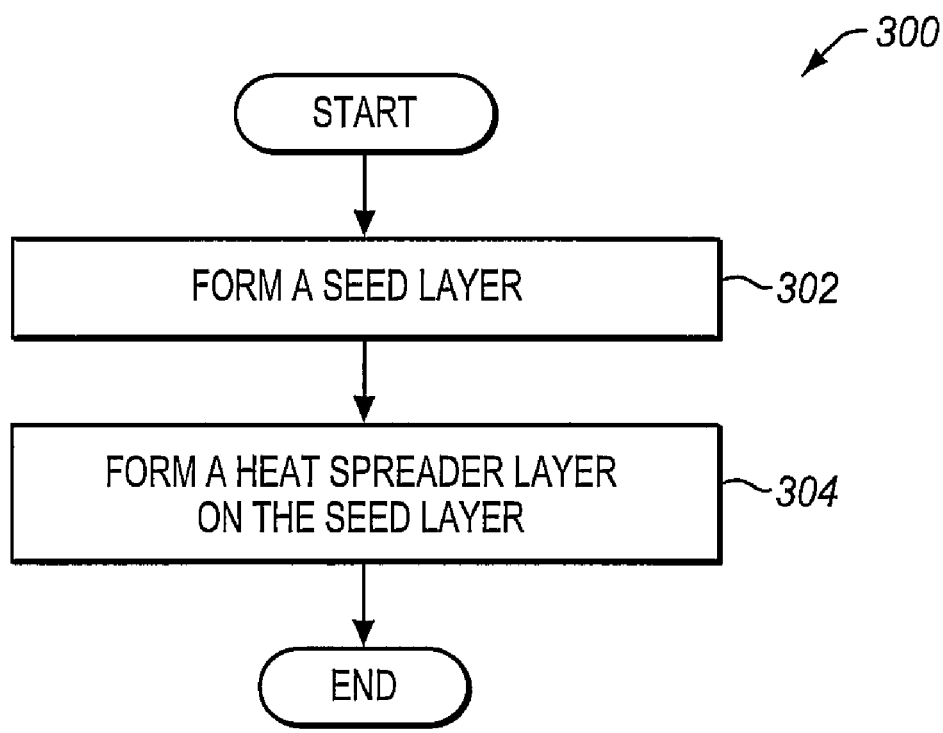
FIG. 3 is a flow chart illustrating a method of fabricating a magnetic recording head in an exemplary embodiment of the invention.

FIG. 3 is a flow chart illustrating a method 300 of fabricating a magnetic recording head in an exemplary embodiment of the invention. The steps of method 300 are not all inclusive and may include other steps in other embodiments. Method 300 is used to form a heat spreader structure in a magnetic recording head. The heat spreader structure may be fabricated in the magnetic recording head in different desired locations to dissipate heat, such as in the undercoat (e.g., layer 104 of FIG. 1) of a magnetic recording head.

Figure 4:
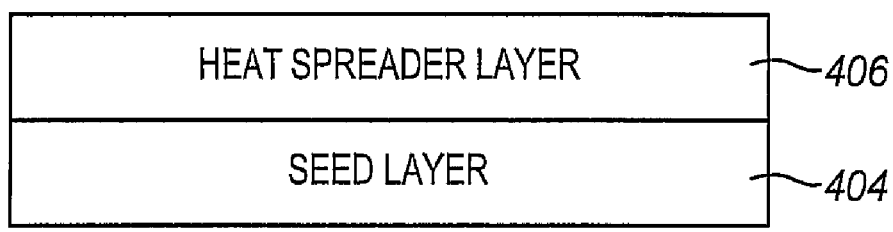
FIG. 4 illustrates a heat spreader structure of a magnetic recording head formed according to the method of FIG. 3.

In step 302 of method 300, a seed layer is formed. The seed layer may be formed from NiTa, Alumina, or another desired material. In step 304, a heat spreader layer is formed on the seed layer. FIG. 4 illustrates a heat spreader structure 400 of a magnetic recording head formed according to method 300. Heat spreader structure 400 includes a seed layer 404 with a heat spreader layer 406 formed on seed layer 404.

Seed layer 404 is made from a material that increases the thermal conductivity of heat spreader layer 406 when heat spreader layer 406 is grown on seed layer 404. Seed layer 404 generates a well-oriented crystalline structure in heat spreader layer 406 to increase the thermal conductivity of heat spreader layer 406.

In one embodiment, seed layer 404 is comprised of NiTa or Alumina and heat spreader layer 406 is comprised of Aluminum Nitride. When the Aluminum Nitride is grown on NiTa, the NiTa generates a well-oriented crystalline structure in the Aluminum Nitride to increase the thermal conductivity of the Aluminum Nitride to about 66 W/m–K. When the Aluminum Nitride is grown on Alumina, the Alumina generates a well-oriented crystalline structure in the Aluminum Nitride to increase the thermal conductivity of the Aluminum Nitride to about 55 W/m–K. Using either of these seed layers, the thermal conductivity of the Aluminum Nitride is greater than about 55 W/m-K. This is a marked improvement over when Aluminum Nitride is grown on a material such as $Al_2O_3$. When Aluminum Nitride is grown on amorphous $Al_2O_3$, the crystalline structure of the Aluminum Nitride has a poor texture and provides a thermal conductivity of about 46 W/m-K. With this thermal conductivity, the Aluminum Nitride does not dissipate heat as effectively as when it is grown on seed layer 404.

Another measure of the crystalline structure of Aluminum Nitride is a Full Width Half Maximum (FWHM) measurement. When the Aluminum Nitride is grown on NiTa, the NiTa the crystalline structure of the Aluminum Nitride has a FWHM measurement of about 1 degree. As a comparison, when Aluminum Nitride is grown on $Al_2O_3$, the crystalline structure of the Aluminum Nitride has a FWHM measurement of about 4 degrees. A lower FWHM measurement indicates a more controlled and well-oriented crystalline structure. Using either NiTa or Alumina as seed layer 404, the FWHM measurement of Aluminum Nitride is less than about 1.5 degrees.

As previously stated, the head spreader structure 400 shown in FIG. 4 may be fabricated in different locations of a magnetic recording head, one such location being the undercoat. An undercoat comprises one or more layers that are deposited for a magnetic recording head above a substrate and below a shield layer for the read element. To fabricate head spreader structure 400 in the undercoat of a magnetic recording head, seed layer 404 (see FIG. 4) may be formed on the substrate, such as an AlTiC substrate. Heat spreader layer 406 may then be formed on seed layer 404 to form the undercoat of a magnetic recording head (possibly along with other layers). An undercoat formed as described above may be used in magnetic recording head 100 of FIG. 1 as a replacement for undercoat 104. The heat spreader structure 400 shown in FIG. 4 may also be used in other locations of a magnetic recording head, such as between the top shield of the read element and the write element, or in the overcoat.

Figure 5:
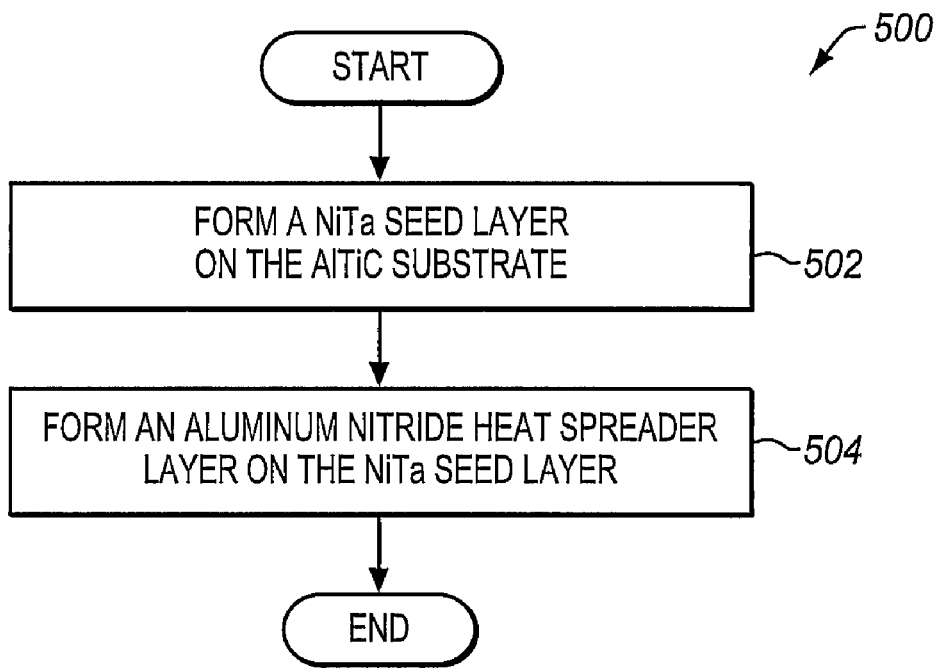
FIG. 5 is a flow chart illustrating a method of fabricating an undercoat of a magnetic recording head in an exemplary embodiment of the invention.
Figure 6:
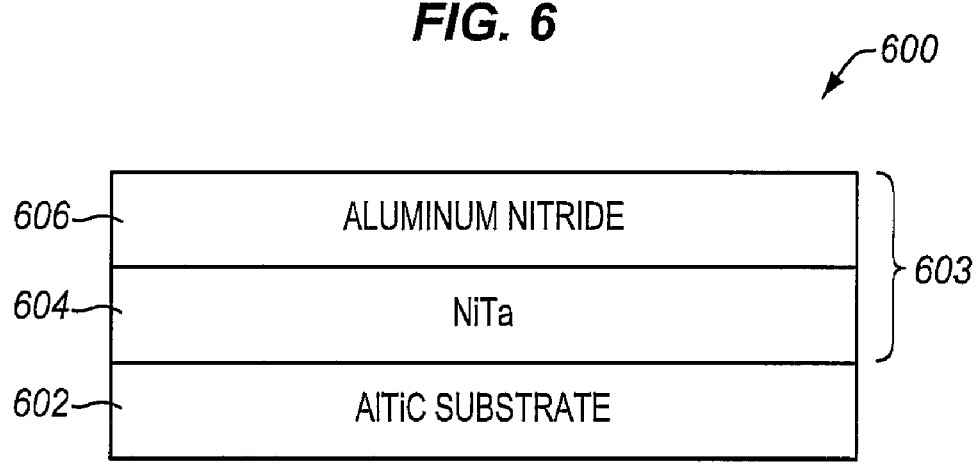
FIG. 6 illustrates a magnetic recording head formed according to the method of FIG. 5.

FIG. 5 is a flow chart illustrating a method 500 of fabricating an undercoat of a magnetic recording head in an exemplary embodiment of the invention. In step 502 of method 500, a seed layer of NiTa is formed on an AlTiC substrate. The NiTa seed layer may be formed through an ion beam deposition process or a sputtering process in this embodiment. In step 504, a heat spreader layer of Aluminum Nitride is formed on the seed layer. The Aluminum Nitride layer may be formed through a sputtering process in this embodiment. For instance, the Aluminum Nitride may be deposited by pulsed DC reactive deposition in $Ar/N_2$ from an Al target with the substrate maintained at 350 degrees Celsius. FIG. 6 illustrates a magnetic recording head 600 formed according to method 500. Magnetic recording head 600 includes an AlTiC substrate 602 with an undercoat 603 formed on substrate 602. Undercoat 603 includes a NiTa seed layer 604 formed on substrate 602. Undercoat 603 also includes an Aluminum Nitride heat spreader layer 606 formed on seed layer 604. As discussed above, when the Aluminum Nitride is grown on NiTa, the NiTa generates a well-oriented crystalline structure in the Aluminum Nitride to increase the thermal conductivity of the Aluminum Nitride to about 66 W/m-K. The Aluminum Nitride can thus effectively dissipate heat in magnetic recording head 600 with this thermal conductivity. The undercoat 603 shown in FIG. 6 may be used in magnetic recording head 100 of FIG. 1 as a replacement for undercoat 104. The NiTa seed layer 604 and the Aluminum Nitride heat spreader layer 606 may additionally or alternatively be fabricated in other locations in magnetic recording head 100, as the undercoat is just one example.

Figure 7:
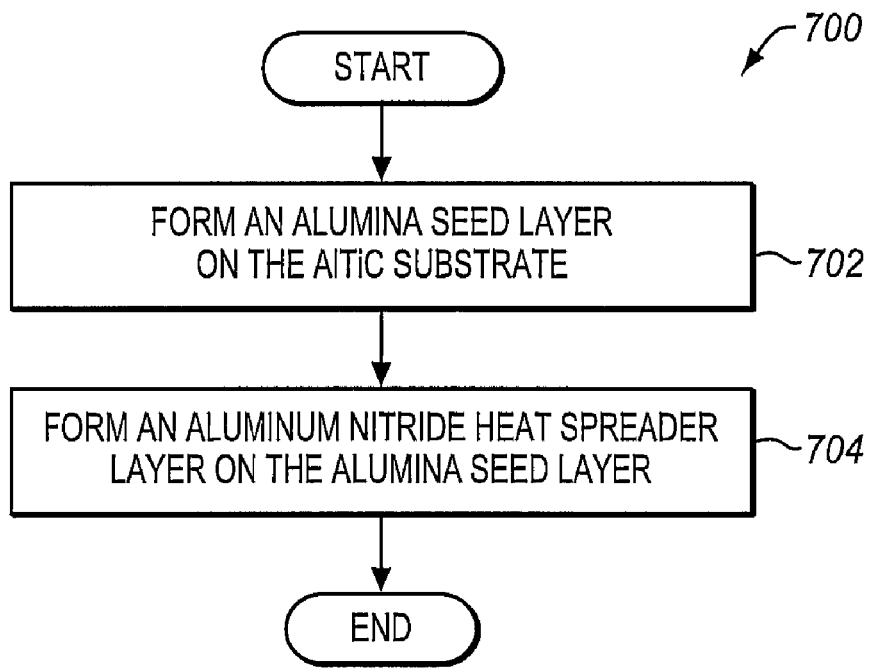
FIG. 7 is a flow chart illustrating another method of fabricating an undercoat of a magnetic recording head in an exemplary embodiment of the invention.
Figure 8:
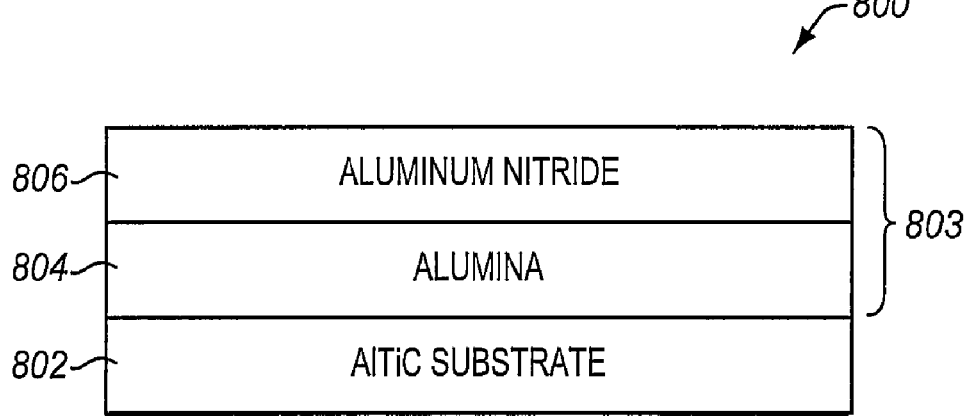
FIG. 8 illustrates a magnetic recording head formed according to the method of FIG. 7.

FIG. 7 is a flow chart illustrating another method 700 of fabricating an undercoat of a magnetic recording head in an exemplary embodiment of the invention. In step 702 of method 700, a seed layer of Alumina is formed on an AlTiC substrate. The Alumina seed layer may be formed through a sputtering process in this embodiment. In step 704, a heat spreader layer of Aluminum Nitride is formed on the seed layer. The Aluminum Nitride layer may be formed through a sputtering process in this embodiment. FIG. 8 illustrates a magnetic recording head 800 formed according to method 700. Magnetic recording head 800 includes an AlTiC substrate 802 with an undercoat 803 formed on substrate 802. Undercoat 803 includes an Alumina seed layer 804 formed on substrate 802. Magnetic recording head 800 also includes an Aluminum Nitride heat spreader layer 806 formed on seed layer 804. As discussed above, when the Aluminum Nitride is grown on Alumina, the Alumina generates a well-oriented crystalline structure in the Aluminum Nitride to increase the thermal conductivity of the Aluminum Nitride to about 55 W/m-K. The Aluminum Nitride effectively dissipates heat in magnetic recording head 800 with this thermal conductivity. The undercoat 803 shown in FIG. 8 may be used in magnetic recording head 100 of FIG. 1 as a replacement for undercoat 104. The Alumina seed layer 804 and the Aluminum Nitride heat spreader layer 806 may additionally or alternatively be fabricated in other locations in magnetic recording head 100, as the undercoat is just one example.

Although specific embodiments were described herein, the scope of the invention is not limited to those specific embodiments. The scope of the invention is defined by the following claims and any equivalents thereof.

We claim:

1. A method comprising:
forming an undercoat for a magnetic recording head directly on a substrate; and
forming a shield layer for the magnetic recording head directly on the undercoat;
wherein forming the undercoat includes:
forming a seed layer of NiTa; and
forming a heat spreader layer directly on the NiTa seed layer so that the NiTa seed layer increases the thermal conductivity of the heat spreader layer;
wherein the heat spreader layer comprises Aluminum Nitride and the heat spreader layer is able to dissipate heat in the magnetic recording head that writes to a magnetic media.

2. The method of claim 1 wherein the NiTa seed layer generates a crystalline structure in the heat spreader layer to provide a thermal conductivity in the heat spreader layer greater than about 55 W/m-K.

3. The method of claim 1 wherein forming a seed layer comprises:
forming the seed layer on the substrate of Alumina-Titanium Carbide.

4. A heat spreader structure comprising:
an undercoat formed for a magnetic recording head that writes to a magnetic media, the undercoat comprising:
a seed layer of NiTa formed directly on a substrate; and
a heat spreader layer formed between the seed layer and a shield, wherein the NiTa seed layer is adapted to increase the thermal conductivity of the heat spreader layer;
wherein the heat spreader layer comprises Aluminum Nitride and the heat spreader layer is able to dissipate heat in the magnetic recording head that writes to the magnetic media.

5. The heat spreader structure of claim 4 wherein the NiTa seed layer generates a crystalline structure in the heat spreader layer to provide a thermal conductivity in the heat spreader layer greater than about 55 W/m-K.

6. The heat spreader structure of claim 4 wherein a crystalline structure in the heat spreader layer has the characteristic of an FWHM less than about 1.5 degrees.

7. A method comprising:
fabricating a magnetic recording head that writes to a magnetic media by:
forming a seed layer of NiTa directly on a substrate;
forming a heat spreader layer directly on the seed layer that is able to dissipate heat in the magnetic recording head as the magnetic recording head writes to the magnetic media; wherein the heat spreader layer comprises Aluminum Nitride and
forming a shield layer directly on the heat spreader layer;
wherein the NiTa seed layer generates a crystalline structure in the heat spreader layer to provide a thermal conductivity in the heat spreader layer greater than about 55 W/m-K.

8. The method of claim 7 wherein forming a seed layer comprises:
forming the seed layer on the substrate of Alumina-Titanium Carbide.

9. The method of claim 7 wherein forming a seed layer comprises:
depositing the NiTa seed layer using an ion beam deposition process.

10. The method of claim 7 wherein forming a seed layer comprises:
depositing the NiTa seed layer using a sputtering process.

11. The method of claim 7 wherein the crystalline structure in the heat spreader layer has the characteristic of an FWHM less than about 1.5 degrees.

12. A magnetic recording head that writes to a magnetic media, the magnetic recording head comprising:
an Alumina-Titanium Carbide substrate for the magnetic recording head;
an undercoat for the magnetic recording head formed directly on the substrate, where the undercoat includes a heat spreader structure; and
a shield for the magnetic recording head formed directly on the undercoat;
wherein the heat spreader structure includes:
a NiTa layer; and
an Aluminum Nitride layer grown on the NiTa layer;
wherein the Aluminum Nitride layer is able to dissipate heat in the magnetic recording head that writes to the magnetic media.

13. The magnetic recording head of claim 12 wherein the NiTa layer generates a crystalline structure in the Aluminum Nitride layer to provide a thermal conductivity in the Aluminum Nitride layer greater than about 55 W/m-K.

14. The magnetic recording head of claim 12 wherein a crystalline structure in the Aluminum Nitride layer has the characteristic of an FWHM less than about 1.5 degrees.

15. A method comprising:
fabricating a magnetic recording head that writes to a magnetic media by:
forming an undercoat directly on an Alumina-Titanium Carbide substrate, where the undercoat includes a heat spreader structure; and
forming a shield layer directly on the undercoat;
wherein forming the heat spreader structure of the undercoat includes:
forming a NiTa layer; and
forming an Aluminum Nitride layer directly on the NiTa layer;
wherein the Aluminum Nitride layer is able to dissipate heat in the magnetic recording head that writes to the magnetic media.

16. The method of claim 15 wherein the NiTa layer generates a crystalline structure in the Aluminum Nitride layer to provide a thermal conductivity in the Aluminum Nitride layer greater than about 55 W/m-K.

17. The method of claim 15 wherein a crystalline structure in the Aluminum Nitride layer has the characteristic of an FWHM less than about 1.5 degrees.

* * * * *